US012341770B2

(12) United States Patent
Li et al.

(10) Patent No.: US 12,341,770 B2
(45) Date of Patent: Jun. 24, 2025

(54) DEVICES AND METHODS TO VALIDATING MULTIPLE DIFFERENT FACTOR CATEGORIES

(71) Applicant: Lenovo (Singapore) Pte. Ltd., New Tech Park (SG)

(72) Inventors: Scott Wentao Li, Cary, NC (US); Igor Stolbikov, Apex, NC (US); Alfredo Zugasti, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 458 days.

(21) Appl. No.: 17/195,778

(22) Filed: Mar. 9, 2021

(65) Prior Publication Data

US 2022/0294778 A1     Sep. 15, 2022

(51) Int. Cl.
| | |
|---|---|
| *H04L 9/40* | (2022.01) |
| *G06F 21/36* | (2013.01) |
| *G06F 21/46* | (2013.01) |
| *H04L 9/08* | (2006.01) |
| *H04L 9/32* | (2006.01) |

(52) U.S. Cl.
CPC .......... *H04L 63/0838* (2013.01); *G06F 21/36* (2013.01); *G06F 21/46* (2013.01); *H04L 9/0897* (2013.01); *H04L 9/3236* (2013.01); *H04L 63/0846* (2013.01); *H04L 63/0853* (2013.01); *H04L 63/0861* (2013.01); *H04L 63/102* (2013.01); *H04L 2463/082* (2013.01)

(58) Field of Classification Search
CPC . H04L 63/0838; H04L 9/0897; H04L 9/3236; H04L 63/0846; H04L 63/0853; H04L 63/0861; H04L 63/102; H04L 2463/082; G06F 21/36; G06F 21/46
See application file for complete search history.

(56) References Cited

U.S. PATENT DOCUMENTS

| | | | | |
|---|---|---|---|---|
| 5,666,415 | A | * | 9/1997 | Kaufman .............. H04L 9/3226 713/172 |
| 8,704,939 | B1 | * | 4/2014 | Cho ..................... H04N 23/675 348/333.02 |

(Continued)

OTHER PUBLICATIONS

A. P. Sabzevar and A. Stavrou, "Universal Multi-Factor Authentication Using Graphical Passwords," 2008 IEEE International Conference on Signal Image Technology and Internet Based Systems, Bali, Indonesia, 2008, pp. 625-632, doi: 10.1109/SITIS.2008.92. (Year: 2008).*

(Continued)

*Primary Examiner* — Luu T Pham
*Assistant Examiner* — Paul J Skwierawski
(74) *Attorney, Agent, or Firm* — Dean D. Small; The Small Patent Law Group, LLC (57) ABSTRACT

A computer implemented method, device and computer program device are provided including a processor; a storage medium to store a user defined password (UDP) factor and program instructions accessible by the processor; wherein, responsive to execution of the program instructions, the processor to: generate a first machine generated indicia (MGI) code indicative of the UDP factor; and generate a second MGI code indicative of a time-based one-time password (TOTP) factor; and a display to display the first and second MGI codes during an authentication operation.

9 Claims, 5 Drawing Sheets

(56) References Cited

U.S. PATENT DOCUMENTS

| | | | | |
|---|---|---|---|---|
| 9,887,992 | B1* | 2/2018 | Venkat | G06F 21/35 |
| 10,826,900 | B1* | 11/2020 | Poder | H04L 63/105 |
| 2011/0000958 | A1* | 1/2011 | Herzig | G06K 7/1093 |
| | | | | 235/375 |
| 2013/0233916 | A1* | 9/2013 | Tran | G06K 19/06037 |
| | | | | 235/375 |
| 2014/0208400 | A1* | 7/2014 | Henshaw | H04L 67/04 |
| | | | | 726/5 |
| 2015/0302252 | A1* | 10/2015 | Herrera | G06V 40/70 |
| | | | | 382/117 |
| 2016/0307194 | A1* | 10/2016 | Bhatnagar | H04L 63/0838 |
| 2017/0264608 | A1* | 9/2017 | Moore | G07C 9/257 |
| 2017/0279795 | A1* | 9/2017 | Redberg | H04L 63/0861 |
| 2023/0351923 | A1* | 11/2023 | Forte | G06F 21/64 |
| 2024/0005820 | A1* | 1/2024 | Forte | H04L 9/3226 |

OTHER PUBLICATIONS

Mozhgan Azimpourkivi et al., Camera Based Two Factor Authentication Through Mobile and Wearable Devices, Proceedings of the ACM on Interactive, Mobile, Wearable and Ubiquitous Technologies, vol. 1 Issue 3, Article No. 35, pp. 1-37, Published:Sep. 11, 2017 (Year: 2017).*

Fan et al, Provably secure remote truly three-factor authentication scheme with privacy protection on biometrics, IEEE Transactions on Information Forensics and Security, pp. 933-945 (2009). J (Year: 2009).*

* cited by examiner

DEVICES AND METHODS TO VALIDATING MULTIPLE DIFFERENT FACTOR CATEGORIES

FIELD

Embodiments of the present disclosure generally relate to cybersecurity and more particularly to methods and systems to facilitate hybrid multi-factor authentication.

BACKGROUND OF THE INVENTION

Cybersecurity is very important to protect individuals' personal and business information. As nonlimiting examples, cyber security is important when logging into business or personal networks, on-line banking, shopping, investing, bill pay, and the like. In addition, companies desire third party vendors and independent contractors to have access to company files and to be part of a company email network to ensure control and protect information provided to these outside parties, and to facilitate business.

Today, no single authentication factor, no matter how well designed, can afford total security. In general, authentication information may be categorized into three general categories, namely authentication information known to a user (e.g., a password, challenge/responses), machine generated authentication information (e.g., keys, tokens or other computer-generated certificates), and biometric authentication information (e.g., facial recognition, fingerprints, voice recognition, retinal scans). However, the potential remains that any one category of authentication information may be compromised. For example, passwords may be guessed, and computer-generated tokens may be stolen or mimicked (e.g., through malware).

Biometric authentication information (e.g., touch ID and/or face ID) has become more popular as it is easier to use instead of a password or computer-generated token/certificate, and offers a certain level of security. However, biometric authentication information also has certain security weaknesses. For example, an authentication system that utilizes facial recognition, retinal scans or fingerprints may be compromised when an unauthorized individual is able to use an electronic device to present a digital image of an authorized user's face, retina or fingerprint.

Consequently, the preferred form of security utilizes multifactor authentication (MFA). However, multifactor authentication can be cumbersome to use and time-consuming from the user perspective. For example, a common MFA approach is for the user to open an application, and type a user ID and password, as the first authentication factor. The second authentication factor may then be biometrics (e.g., facial or fingerprint scan). Alternatively, the second authentication factor may involve the application texting or emailing a security code to the user's phone or email account, after which the user must reenter the security code into the application.

A need remains for improved multifactor authentication methods and systems that are more intuitive and less time-consuming, while maintaining a high level of security.

SUMMARY

In accordance with an embodiment a device is provided that comprises: a processor; a storage medium to store a user defined password (UDP) factor and program instructions accessible by the processor; wherein, responsive to execution of the program instructions, the processor to: generate a first machine generated indicia (MGI) code indicative of the UDP factor; and generate a second MGI code indicative of a time-based one-time password (TOTP) factor; and a display to display the first and second MGI codes during an authentication operation.

Additionally or alternatively, the first and second MGI codes represent first and second matrix codes, the display to display the first and second matrix codes in one of i) a simultaneous manner or ii) an alternating and successively repeating manner. Additionally or alternatively, the processor is further configured to rotate the display alternately between presentation of the first and second matrix codes in the alternating and successively repeating manner. Additionally or alternatively, the device further comprises an input to receive the UDP factor, the processor to generate a password hash based on the UDP factor. Additionally or alternatively, the storage medium is further configured to store an encryption algorithm executable by the processor to generate the password hash by iteratively encrypting the UDP factor. Additionally or alternatively, the storage medium is further configured to store a TOTP generation algorithm executable by the processor to generate the TOTP factor based on a time authentication factor and a pre-shared key, the pre-shared key stored in the storage medium and provided to an authentication service, the TOTP factor valid for a predetermined period of time. Additionally or alternatively, the processor is configured to determine when the authentication operation is initiated and in response thereto, the processor to execute the TOTP algorithm to generate the TOTP factor based in part on a current time of day as the time authentication factor.

In accordance with embodiments herein, a method is provided that comprises: obtaining, at an access point (AP) computing device, image data representative of content in a field of view of a camera of the AP computing device, the content including machine generated indicia (MGI) codes displayed on a trusted computing device; validating factors from different factor categories by validating at least two of i), ii) or iii): i) validating a candidate user defined password (UDP) factor by; 1) identifying, from the image data, a first MGI code displayed on the trusted computing device, the first MGI code representative of the candidate UDP factor; and 2) determining when the candidate UDP factor corresponds to an authentication UDP factor associated with a user account, the authentication UDP factor stored at an authentication service; ii) validating a candidate time-based one-time password (TOTP) factor by: 1) identifying, from the image data, a second MGI code displayed on the trusted computing device, the second MGI code representative of the candidate TOTP factor; and 2) determining when the candidate TOTP factor corresponds to an authentication TOTP factor; or iii) validating a candidate biometric factor by; 1) identifying a candidate biometric factor from at least one of the image data or biometric data from a biometric sensor; and 2) determining when the candidate biometric factor corresponds to the authentication biometric factor; and verifying an authentication operation based on the at least two of the i), ii), and iii) validate operations.

Additionally or alternatively, the authentication operation is verified based on validation of the candidate UDP factor and the candidate TOTP factor, the authentication operation allowing access, through the AP computing device, to a network resource. Additionally or alternatively, the image data includes a first image that includes the first MGI code and a second image that includes the second MGI code, the first and second MGI codes representing first and second matrix codes, the method further comprising displaying, on the trusted computing device, the first and second matrix codes in one of i) a simultaneous manner or ii) an alternating and successively repeating manner. Additionally or alternatively, the authentication operation is verified based on validation of the candidate UDP factor, the candidate TOTP factor and the candidate biometric factor. Additionally or alternatively, the method further comprises capturing the candidate biometric factor, utilizing a biometric reader, for a user proximate to the trusted computing device while the trusted computing device displays at least one of the first or second MGI codes. Additionally or alternatively, the method further comprises performing the iii) validation operation by at least one of facial recognition, retinal scan, fingerprint detection, or voice recognition based on data collected by the camera or a sensor. Additionally or alternatively, the method further comprises generating an authentication password hash based on an account authentication password in the factors, and declaring the i) validation when the candidate password hash matches the authentication password hash. Additionally or alternatively, the method further comprises generating the authentication TOTP factor based on a time authentication factor and a pre-shared key, and declaring the ii) validation when the candidate TOTP factor matches the authentication TOTP factor.

In accordance with embodiments herein, a computer program product is provided that comprises a non-signal computer readable storage medium comprising computer executable code to: generate a first machine generated indicia (MGI) code indicative of a candidate password hash based on a user defined candidate password; and generate a second MGI code indicative of a candidate time-based one-time password (TOTP); and display the first and second MRI codes during an authentication operation.

Additionally or alternatively, the first and second MGI codes represent first and second matrix codes, the computer executable code to: direct a display to display the first and second matrix codes in one of i) a simultaneous manner or ii) an alternating and successively repeating manner. Additionally or alternatively, the computer executable code is to at least one of: i) generate the candidate password hash by iteratively encrypting the candidate password; ii) generate the candidate TOTP based on a time authentication factor and a pre-shared key, the pre-shared token stored in the storage medium and provided to an authentication system, the candidate TOTP valid for a predetermined period of time; or iii) determine when the authentication operation is initiated and in response thereto, generate the candidate TOTP based in part on a current time of day as the time authentication factor. Additionally or alternatively, the computer executable code is to: identify an account authentication password from authentication data associate with a first user account; obtain an authentication TOTP; obtain image data representative of the first and second MGI codes; declare a first validation when the candidate password from the first MGI code corresponds to the account authentication password; declare a second validation when the candidate TOTP from the second MGI code corresponds to the authentication TOTP; and verify an authentication operation based on the first and second validations. Additionally or alternatively, the computer executable code is to verify the authentication operation based on validation of the candidate UDP factor and the candidate TOTP factor, the authentication operation allowing access, through the AP computing device, to a network resource.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "password" as used throughout is used to refer to a string of characters, that can include numbers, letters, symbols, or the like used to gain access to information.

The terms "hash" and "hashed" shall mean a scrambled representation of an item, such as a password, based on a key. A hashed password represents a hash value generated from a combination of a password and the key utilizing one or more hashing algorithms.

The terms "time-based one-time password" and "TOTP" shall mean a temporary password that is computer-generated based on a predefined key and a time authentication factor, such as the present time of day when the TOTP is generated. The temporary password will only remain valid for a relatively short period of time, such as a few seconds or a few minutes, but in general will expire within one second to 30 minutes after the TOTP is generated.

Network resources include private and public networks, websites and applications, operating on various electronic devices, that allow access to various private, public and/or business related files, records, services, accounts the like. Examples of the network resources include, but are not limited to, web-based or network-based data storage services, social networking applications, shopping services, microblogging accounts, payment services, multimedia content delivery services (for delivery of online magazines, music, video, etc.) and financial services (such as credit/banking services). The network resources may represent a Web service or a network service for an e-commerce business, financial institution, or any other commercial, non-commercial, personal, nonprofit or other entity.

The term "trusted", when used in connection with describing a computing device, shall mean a computing device owned and/or controlled by an individual, that stores one or more user defined passwords. For example, a trusted computing device may represent a smart phone, tablet device, laptop computer or other portable computing device that is controlled by one person and that stores one or more passwords (of the person) for other network resources (e.g., office network password, bank account password, etc.) and is not accessible without entering the user password or user biometric information.

The terms "access point" and "AP", when used in connection with describing a computing device, shall mean a computing device that provides access to network resources and is not a trusted computing device, but instead is a computing device usable by people other than the individual with the trusted computing device. For example, an AP computing device may represent a kiosk, automated teller machine, publicly accessible computer and the like. In a business context, as another example, an AP computing device may represent an office desktop computer, laptop computer, tablet device that may be used by one or more employees of a company in connection with day-to-day business.

For the avoidance of doubt, a computing device that represents a trusted computing device for a first individual, may be utilized as an AP computing device for one or more other individuals. Similarly, the first individual may utilize the trusted computing device of another individual as an AP computing device.

Figure 1:
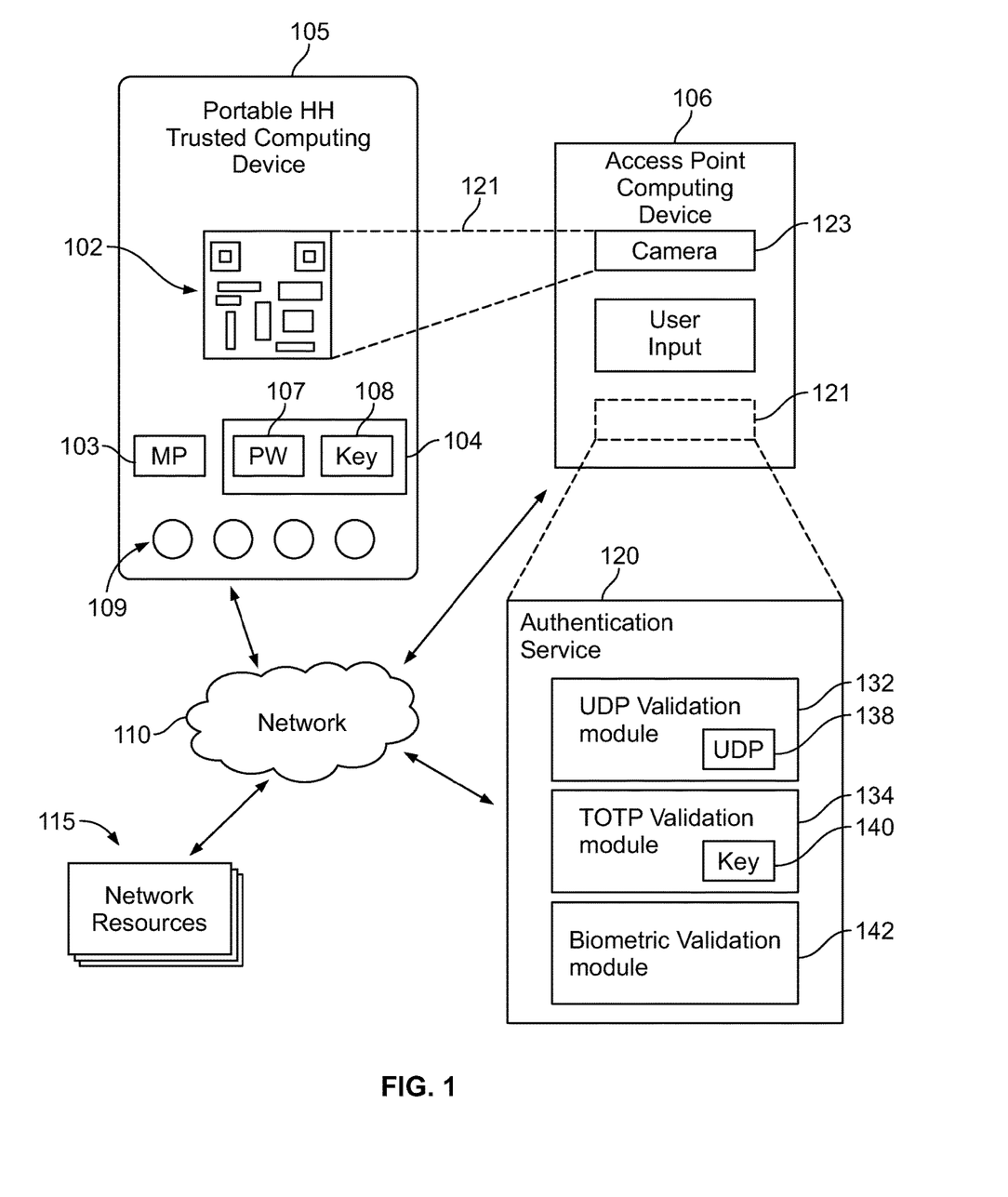
FIG. 1 is a block diagram of a system 100 for providing MFA access to one or more network resources according to various embodiments described herein.

FIG. 1 is a block diagram of a system 100 for providing MFA access to one or more network resources according to various embodiments described herein. The system 100 includes one or more trusted computing devices 105 and one or more AP computing devices 106. The trusted computing device 105 is owned and/or controlled by an individual who has various accounts set up with various network recourses 115 (e.g., office accounts, bank accounts, social media accounts, email accounts, etc.) The AP computing device 106 operates one or more applications that are configured to communicate via network 110 with network resources 115. The applications operate on the AP computing device 106 and/or on a remote server to provide access to the corresponding network resource 115.

Additionally or alternatively, the AP computing device 106 includes an authentication service 120 (as denoted by dashed lines from the dashed block 121. The authentication service 120 may represent computer executable code stored, on the AP computing device 106, in one or more storage medium to direct one or more processors to perform corresponding authentication operations. Optionally, the authentication service 120 may represent computer executable code stored on a remote server, in one or more storage medium to direct one or more processors to perform the corresponding authentication operations. The authentication service 120 is configured to perform options described herein to validate a collection of factors from different categories of factors for a user and, based on the validation, approve the user's access to a requested network resource 115. While the block diagram of FIG. 1 illustrates the AP computing device 106 to be physically separate from the authentication service 120, optionally, the functionality of the authentication service 120 may be integrated within the AP computing device 106.

By way of example, a trusted computing device 105 may be a mobile device, such as a cellular telephone, smartphone, tablet, a wearable device such as a smart watch or smart glasses, or other portable electronic terminal that is configured to access the network 110 over a wired or wireless connection and that is generally uniquely identifiable and uniquely associated with an individual user. In some embodiments, the trusted computing device 105 may have a physical size or form factor that enables it to be easily carried or transported by a user, or the trusted computing device 105 may have a larger physical size or form factor than a mobile device.

Figure 2A:
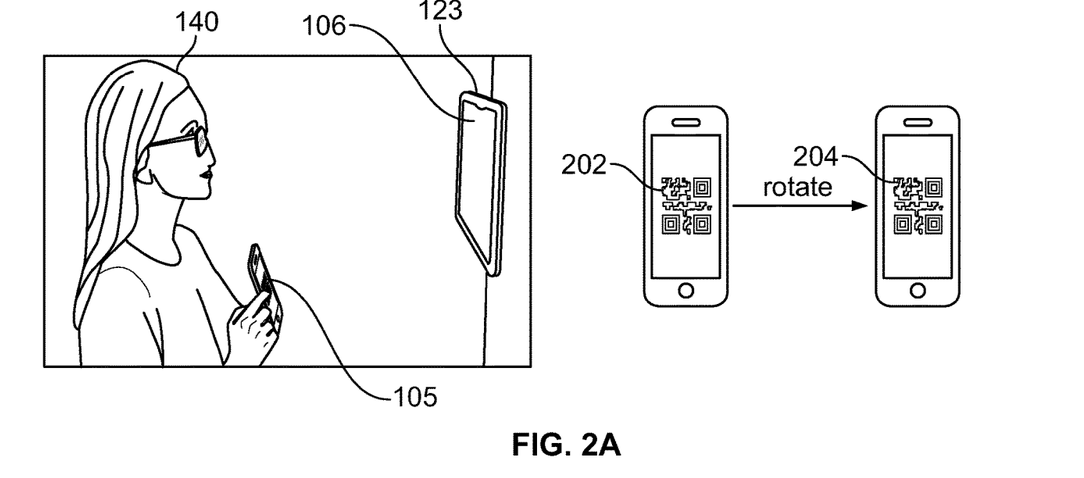
FIG. 2A illustrates an example implementation in accordance with embodiments herein.

FIG. 2A illustrates an example implementation in accordance with embodiments herein. During implementation, the user 140 approaches an AP computing device 106 and holds his/her face within the field of view of the camera 123. While the user 140 stands in front of the camera 123, the user holds a trusted computing device 105 proximate to the users face with the display of the trusted computing device 105 facing the camera 123. The user maintains the trusted computing device 105 within the field of view (FOV) of the camera 123 during an authentication operation. While the trusted computing device 105 is held in front of the camera 123, the display of the trusted computing device 105 displays at least one of the first and second MGI codes 202, 204. The first and second MGI codes may represent two dimensional or three dimensional matrix codes. The first and second MGI codes 202, 204 include and are indicative of corresponding factors. For example, as shown in FIG. 2A, the first MGI code 202 may be indicative of a password hash that is generated based on a UDP factor, while the second MGI code 204 may be indicative of a TOTP factor.

The AP computing device 106 may be a wired or wireless communication terminal, such as a desktop computer, laptop computer, network-ready television, set-top box, a cellular phone, tablet device, text messaging device, permanent home phone, a set-top box, a home automation device, a network attached storage device, a gaming device, a streaming media hub device, a voice command device or any other computing device that allows access to network resources 115. Optionally, the AP computing device 106 may represent a voice command device with functions including question answering, playing music and controlling smart devices.

The AP computing device 106 may access the network 110 using a web browser or a native application executing thereon. In some embodiments, the AP computing device 106 may represent a dedicated access point for a single type of network resource, such as an ATM machine, an office desktop computer connected to an office network, a kiosk for a dedicated service (e.g., airline kiosk at an airport, hotel kiosk in the lobby of a hotel). When individual approaches the AP computing device 106, the individual may enter a user designator (e.g., username). Additionally or alternatively, when the individual approaches the AP computing device 106, the trusted computing device 105 may wirelessly convey the user designator to the AP computing device 106 to inform the AP computing device 106 of which individual desires to access the corresponding network resource 115. Based on the user designator, the AP computing device 106 (and/or authentication service 120) access authentication data associated with a corresponding user account.

Optionally, the user designator may be integrated into the same MGI code as the UDP factor. For example, when a user approaches an ATM machine, airline kiosk, gaming console, dedicated audio/video streaming device, and the like, the user may provide input to the users trusted computing device 1052 instructed the trusted computing device 105 to generate a first MGI code associated with the user's corresponding bank account, online shopping account, email account, or airline account. The first MGI code may be generated based only on the UDP factor (e.g., password and password hash), or alternatively based on a combination of the UDP factor and the user ID for the corresponding bank or airline account.

Additionally or alternatively, the AP computing device 106 may not be dedicated to a particular type of network resource, but instead may afford access to multiple types of network resources. For example, the AP computing device 106 may represent a laptop computer, smart TV, gaming console, audio/video streaming device (e.g., Amazon Fire TV stick device) and the like. When the AP computing device 106 may be utilized to access different types of network resources, an input is provided to designate the network resource of interest. For example, a user may navigate a browser to a web site associated with a bank, hotel chain, airline, etc. Additionally or alternatively, the user may open an application on the AP computing device 106, where the application is specific to the bank, hotel chain, airline, etc.

The AP computing device 106 obtains authentication data associated with a user account for the corresponding network resource. The authentication data may be resident on the AP computing device 106 and/or maintained remotely, such as at an authentication service 120 and/or at a remote server that manages the corresponding network resource 115. The AP computing device 106 accesses network resources 115 including web-based or network-based data, applications, and services, via the network 110. The network 110 may represent one or more of a local area network (LAN), a wide area network (WAN), an Intranet or other private network that may not be accessible by the general public, or a global network, such as the Internet or other publicly accessible network. The network 110 provides communication between the AP computing device 106, one or more authentication services 120 and one or more network resources 115 (such as web servers) that provide the aforementioned network data, applications, or services. The network resources 115 may include a network transceiver, processor, memory, and/or other circuitry configured to coordinate and manage operations for delivering network resources to the AP computing devices 106.

In order to access a network resource 115, the user will login through an AP computing device 106. During the login process, the authentication service 120 validates multiple factors from different categories of factors. For example, the authentication service 120 may validate factors from at least two factor categories. For example, the authentication service 120 may validate a user defined password and a computer generated TOTP. Alternatively, the authentication service 120 may validate a UD password, TOTP and one or more biometric factor.

During the authentication operation, the trusted computing device 105 is held at a position within a field of view 121 of a camera 123 of the AP computing device 106. The processor 103 is configured to determine when an authentication operation is initiated. For example, a user may provide an input instructing the processor 103 to initiate an authentication operation. For example, the user may type or verbally state an instruction, open a login application and the like. Additionally or alternatively, the processor 103 may automatically determine that an authentication operation has been initiated. For example, the processor 103 may detect a proximity condition in which the computing device 105 is within a physical range limit (e.g., 1-3 feet) of the AP computing device 106. Additionally or alternatively, the computing device 105 may determine when the AP computing device 106 opens an authentication operation (e.g., a login screen). For example, the AP computing device 106 may wirelessly convey a message to the competing device 105 indicating that an authentication operation has been activated. Additionally or alternatively, when the computing device 105 is held proximate to the AP computing device 106, the camera of the computing device 105 may detect an image of a login screen (or other login indicia displayed) on the AP computing device 106.

The trusted computing device 105 includes a display 102, a processor 103 and a storage medium 104. The storage medium 104 is configured to store program instructions accessible by the processor, wherein, responsive to execution of the program instructions, the processor 103 is configured to: generate a first machine generated indicia (MGI) code indicative of a password hash based on a user defined password 107 and generate a second MGI code indicative of a time-based one-time password (TOTP). The display 102 is configured to display the first and second MRI codes during an authentication operation.

The trusted computing device 105 further comprises an input 109 that is configured to receive user inputs, such as the user defined password. For example, the entire surface of the computing device 105 may be touch sensitive and represent a part of the input 109. The processor 103 is configured to generate the password hash based on the user defined password 107. The storage medium 104 is further configured to store program instructions including an encryption algorithm executable by the processor 103 to generate the password hash by iteratively encrypting the user defined password 107. The storage medium 104 is further configured to store a TOTP generation algorithm executable by the processor 103 to generate the TOTP based on a time authentication factor and a pre-shared key 108. The key 108 is also provided to the authentication service 120. The key 108 is utilized by the processor 103 and by the authentication service 120, in combination with a time authentication factor, to generate a TOTP that is valid for a predetermined period of time (e.g., 1-30 seconds, 1-5 minutes).

When an authentication operation is initiated, as noted herein, the processor 103 executes the TOTP algorithm to generate the TOTP based in part on a current time of day (e.g., hour: minute: second) as the time authentication factor. Optionally, the time authentication factor may represent a point in time other than a current time of day. The processor 103 then converts the TOTP to a corresponding MGI code. As noted herein, when an authentication operation is initiated, the processor 103 executes the encryption algorithm to generate the password hash based on the user defined password and then converts the password hash to a corresponding MGI code.

As explained herein, the first and second MGI codes may represent first and second matrix codes. For example, the matrix codes may represent Q are codes, barcodes or any other two-dimensional code.

FIG. 2A illustrates examples of first and second MGI codes 202 and 204. For example, the MGI code 202 may correspond to the first MGI code which represents a password hash that is generated based on the user defined password 107. The MGI code 204 may correspond to the second MGI code which represents a TOTP generated by the processor 103. During an authentication operation, the display 102 is configured to display the first and second matrix codes. In accordance with at least one embodiment, the first and second matrix codes may be displayed is a simultaneous manner.

Additionally or alternatively, the processor 103 is further configured to rotate the display 102 alternately between presentation of the first and second matrix codes in the alternating and successively repeating manner. In the example of FIG. 1, a single MGI code is displayed. In the example of FIG. 2A, the display alternately displays the MGI codes 102 and 104 in a successive and repeating manner. The amount of time that the MGI code 102 is displayed before switching to the MGI code 104 may be predetermined, randomly decided and/or varied over time. For example, the amount of time that any single MGI code 102 is displayed may be set to a relatively short period of time (e.g., 1-10 seconds) to help prevent unauthorized copying of the MGI code. After the relatively short period of time, the display switches to the other MGI code 104 and displays the MGI code 104 for a relatively short period of time (e.g., 1-10 seconds).

The MGI codes 102 and 104 may be displayed for the same amount of time or for different amounts of time. For example, the MGI code 102 (related to the password hash) may be displayed for a first period of time (e.g., 1-10 seconds), while the MGI code 104 (related to the TOTP) may be displayed for a time duration, for which the TOTP is valid. For example, when a TOTP is defined to be valid for 30 seconds, the display 102 may display the MGI code 104 for the full duration of the valid period. As another example, when a TOTP is defined as valid for one minute, the display may display the password hash related MGI code 102 for 10 seconds, then switch to the TOTP related MGI code 104 for 20 seconds, then switch back to the password hash related MGI code 102 for another 10 seconds, and then switch back to the TOTP related MGI code 104 for another 20 seconds.

Optionally, during successive iterations between the displays of the first and second MGI codes 102, 104, the duration of time for which the corresponding MGI code is displayed may vary. For example, during a first iteration, the password hash related MGI code 102 may be displayed for 10 seconds, followed by display of the TOTP related MGI code 104 for 10 seconds. During a second iteration, the password hash related MGI code 102 may be displayed for 20 seconds, followed by display of the TOTP related MGI code 104 for 20 seconds. During a third iteration, the password hash related MGI code 102 may be displayed for 30 seconds, followed by display of the TOTP related MGI code 104 for 30 seconds.

In the foregoing example, a single MGI code is generated based on the password hash and a single MGI code is generated based on the TOT P. Optionally, more than one MGI code may be generated based on the password hash and/or more than one MGI code may be generated based on the TOTP. For example, a pair of MGI codes 102 may be generated, based on the same password hash, but with different formats (e.g., one code as a QR code and another code as a barcode). A pair of MGI codes 104 may be generated, based on the same TOT P, but with different formats (e.g., one code as a QR code and another code as a barcode). For example, during a first iteration, the MGI codes 102 and 104 may be displayed utilizing the first format (e.g., first and second QR codes) and, during a second iteration, the MGI codes 102 and 104 may be displayed utilizing the second format (e.g., first and second barcodes). Optionally, the format of the password hash related MGI code 102 may differ from the format of the TOTP related MGI code 104.

Returning to FIG. 1, the authentication service 120 includes a UDP validation module 132, a TOT P validation module 134, and a biometric validation module 142. Optionally, the authentication service 120 may include two of the three validation modules 132, 134 and 142, based on the number of different categories of factors to be validated.

The UDP validation module 132 is configured to validate a candidate UDP factor. To validate the candidate UDP factor, among other things, the UDP validation module 132 identifies, from the image data, a first MGI code displayed on the trusted computing device, the first MGI code representative of the candidate UDP factor, and determines when the candidate UDP factor corresponds to an authentication UDP factor associated with a user account, the authentication UDP factor stored at an authentication service.

The TOTP validation module 134 is configured to validate a candidate TOTP factor. To validate the candidate TOTP factor, among other things, the TOTP validation module 134 identifies, from the image data, a second MGI code displayed on the trusted computing device, the second MGI code representative of the candidate TOTP factor, and determines when the candidate TOTP factor corresponds to an authentication TOTP factor.

The biometric validation module 142 is configured to validate the candidate biometric factor. To validate the candidate biometric factor, among other things, the biometric validation module 142 identifies a candidate biometric factor from at least one of the image data or sensor data from a biometric sensor, and determines when the candidate biometric factor corresponds to the authentication biometric factor.

When the candidate UDP, TOTP and biometric factors are determined to be valid, the authentication service 120 verifies an authentication operation, such as to allow the user to log into a user account associated with a corresponding network resource. For example, the authentication operation may be verified based on validation of the candidate UDP factor and the candidate TOTP factor, and in connection there with the authentication service 120 allows access, through the AP computing 106 device, to a network resource 115.

In accordance with embodiments herein, the authentication service 120 may require that all candidate factors be validated, namely all candidate UDP, TOTP and biometric factors match corresponding authentication UDP, TOT P and biometric factors, respectively. Additionally or alternatively, the authentication service 120 may provide verification when two out of three candidate factors match corresponding authentication factors. For example, in some instances, the user may forget a password, in which case the candidate UDP factor would not match the authentication UDP factor. However, when the user is using a personal cell phone, which represents a trusted computing device, the trusted computing device may generate a correct candidate TOT P factor. The combination of a valid candidate TOT P factor and a valid candidate biometric factor (e.g., facial recognition, fingerprint), may be deemed sufficient to verify the authentication operation and allow the user access to the corresponding network resource.

Additionally or alternatively, when one or more of the candidate UDP, TOT P and biometric factors are validated, but yet at least one of the candidate UDP, TOT P and biometric factors are not validated, the authentication service 120 may provide limited verification with limited access to the network resource. Limited access may provide the user with a subset of the full functionality available to full access. For example, in connection with a bank account or financial records, limited access may allow the user to view banking and financial records, but not allow the user to withdraw or transfer funds from an account. As another example, in connection with a work environment, limited access may allow a user to view certain types of work-related material (e.g., non-sensitive material), but block a users access from sensitive work-related material.

Additionally or alternatively, the authentication service 120 may assign a confidence or certainty level with respect to validation of candidate biometric factors. For example, when facial recognition is utilized, the biometric validation module 142 may return a confidence rating (e.g., a percentage) that the candidate biometric factor matches the authentication biometric factor. For example, the biometric validation module 142 may return a confidence rating of 80% that the image data of a face in the field of view of the camera 123 matches the face associated with the user account.

Figure 2B:
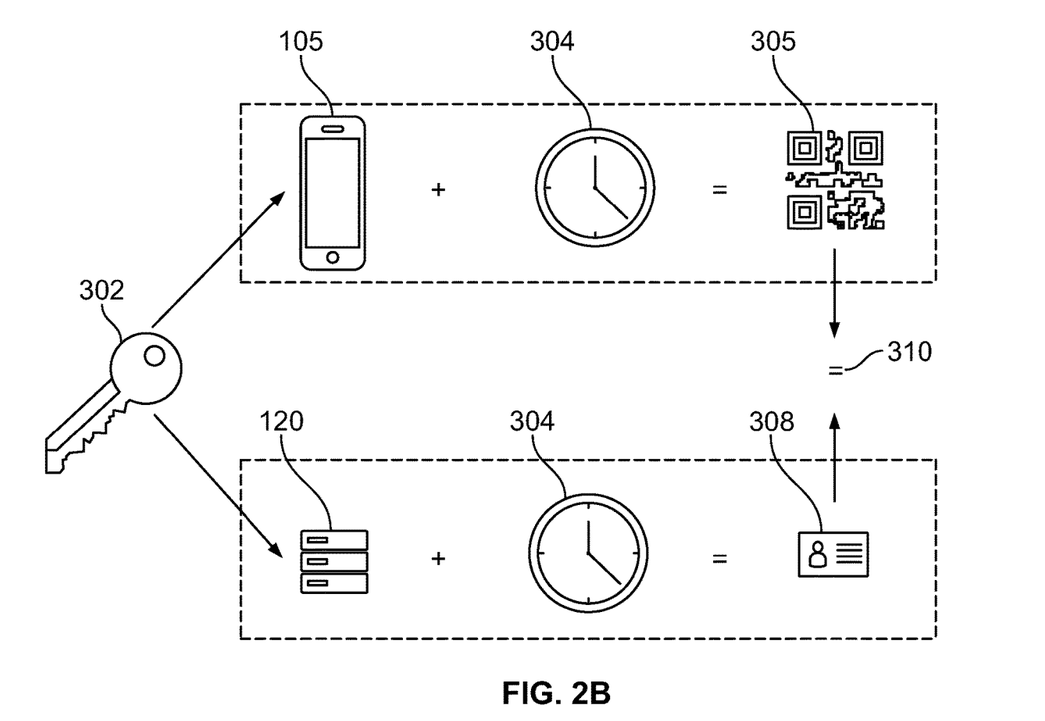
FIG. 2B illustrates a graphic representation of a manner in which TOTP factors may be managed in accordance with embodiments herein.

FIG. 2B illustrates a graphic representation of a manner in which TOTP factors may be managed in accordance with embodiments herein. A pre-shared key 302 is provided to the trusted computing device 105 and the authentication service 120. FIG. 1 illustrates the TOT P key 108, while the authentication service 120 maintains the same key 140. During an authentication operation, each of the trusted computing device 105 and authentication service 120 utilized the common key 108, 140, in combination with a time authentication factor 304 two generate corresponding factors. The trusted computing device 105 combines the key 108 (FIG. 1) with the time authentication factor (e.g., a present day, hour, minute, second) to form an MGI code 306. The MGI code 306 is then displayed on the display of the trusted computing device 105 within the field of view of the camera 123 at the AP computing device 106. The authentication service 120 combines the same key (designated as 140 in FIG. 1) with the same time authentication factor 304 to form an authentication TOTP factor 308. The authentication service 120 identifies the MGI code 306 from image data (captured by the camera 123) and compares (at 310) a candidate TOT P factor (within the MGI code 306) with the authentication TOTP factor 308.

Figure 3:
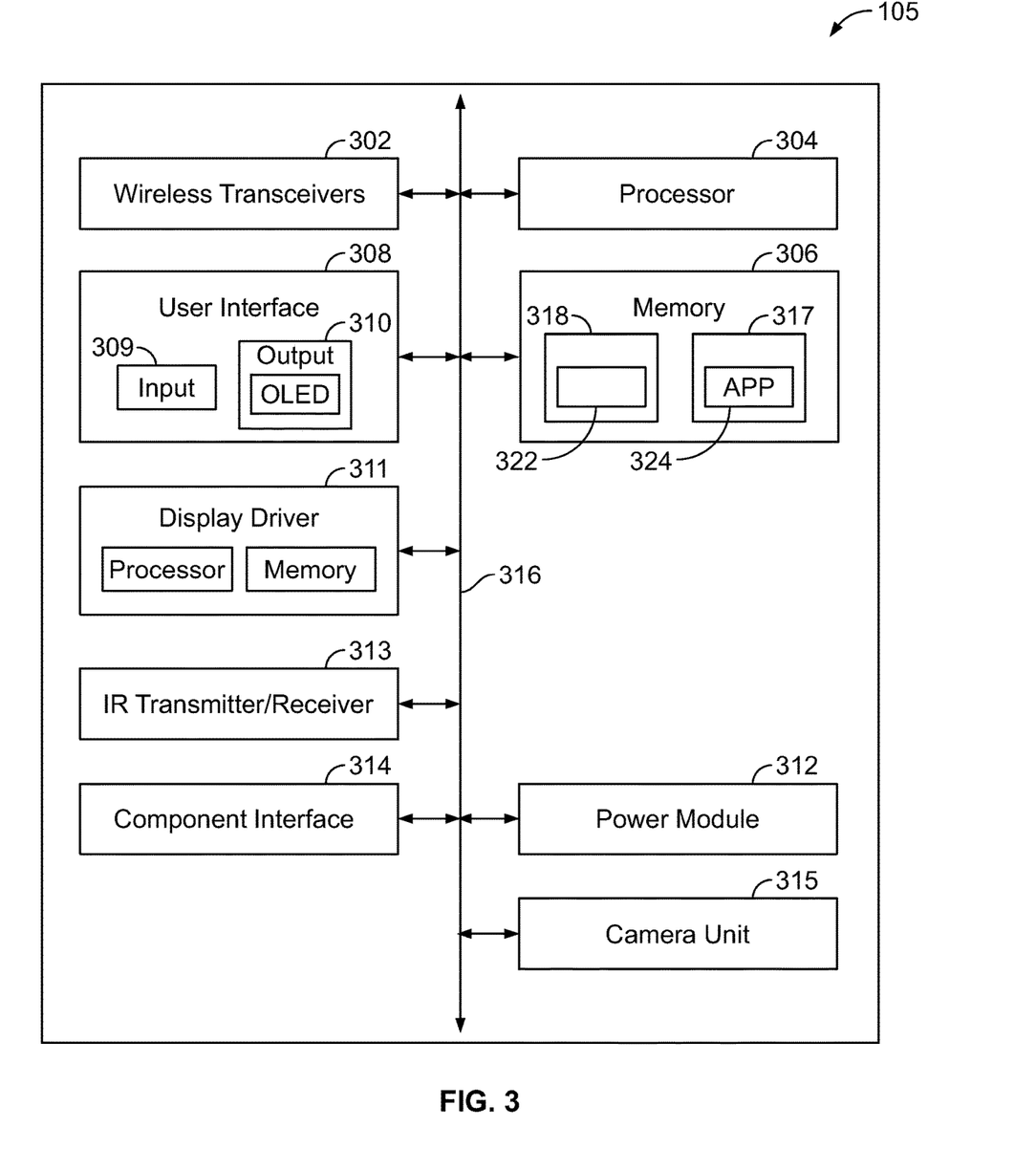
FIG. 3 illustrates a simplified block diagram of the trusted computing device and/or an AP computing device in accordance with embodiments herein.

FIG. 3 illustrates a simplified block diagram of the trusted computing device 105 and/or an AP computing device 106, which includes components such as one or more wireless transceivers 302, one or more processors 304 (e.g., a microprocessor, microcomputer, application-specific integrated circuit, etc.), one or more local storage medium (also referred to as a memory portion) 306, a user interface 308 which includes one or more input devices 309 and one or more output devices 310, a display driver 311, a power module 312, a transmitter/receiver 313, a component interface 314, and a camera unit 315. All of these components can be operatively coupled to one another, and can be in communication with one another, by way of one or more internal communication links 316, such as an internal bus.

The input and output devices 309, 310 may each include a variety of visual, audio, and/or mechanical devices. For example, the input devices 309 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 310 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 310 may include a touch sensitive screen, a non-touch sensitive screen, a text-only display, a smart phone display, an audio output (e.g., a speaker or headphone jack), and/or any combination thereof.

The user interface 308 permits the user to select one or more of a switch, button or icon to collect content elements, and/or enter indicators. As one example, the one or more processors 304 may select a photo/video/memo capture soft button directing the computing device 105 to take a picture, or record video/audio. As another example, the user may select a content collection button (photo/video/memo capture soft button) on the user interface two or more successive times, thereby instructing the computing device 105 to capture the content element.

The local storage medium 306 can encompass one or more memory devices of any of a variety of forms (e.g., read only memory, random access memory, static random access memory, dynamic random access memory, etc.) and can be used by the processor 304 to store and retrieve data. The data that is stored by the local storage medium 306 can include, but need not be limited to, operating systems, applications, user collected content and informational data. Each operating system includes executable code that controls basic functions of the communication device, such as interaction among the various components, communication with external devices via the wireless transceivers 302 and/or the component interface 314, and storage and retrieval of applications and data to and from the local storage medium 306.

Other applications stored in the local storage medium 306 include various application program interfaces (APIs), some of which provide links to/from a cloud hosting service. The power module 312 preferably includes a power supply, such as a battery, for providing power to the other components while enabling the computing device 105 to be portable, as well as circuitry providing for the battery to be recharged. The component interface 314 provides a direct connection to other devices, auxiliary components, or accessories for additional or enhanced functionality, and in particular, can include a USB port for linking to a user device with a USB cable.

Each transceiver 302 can utilize a known wireless technology for communication. Exemplary operation of the wireless transceivers 302 in conjunction with other components of the computing device 105 may take a variety of forms and may include, for example, operation in which, upon reception of wireless signals, the components of computing device 105 detect communication signals and the transceiver 302 demodulates the communication signals to recover incoming information, such as voice and/or data, transmitted by the wireless signals. After receiving the incoming information from the transceiver 302, the processor 304 formats the incoming information for the one or more output devices 310. Likewise, for transmission of wireless signals, the processor 304 formats outgoing information, which may or may not be activated by the input devices 310, and conveys the outgoing information to one or more of the wireless transceivers 302 for modulation to communication signals. The wireless transceiver(s) 302 convey the modulated signals to a remote device, such as a cell tower or a remote server (FIG. 1).

Specific reference will now be made here below to FIGS. 4-5. It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Figure 4:
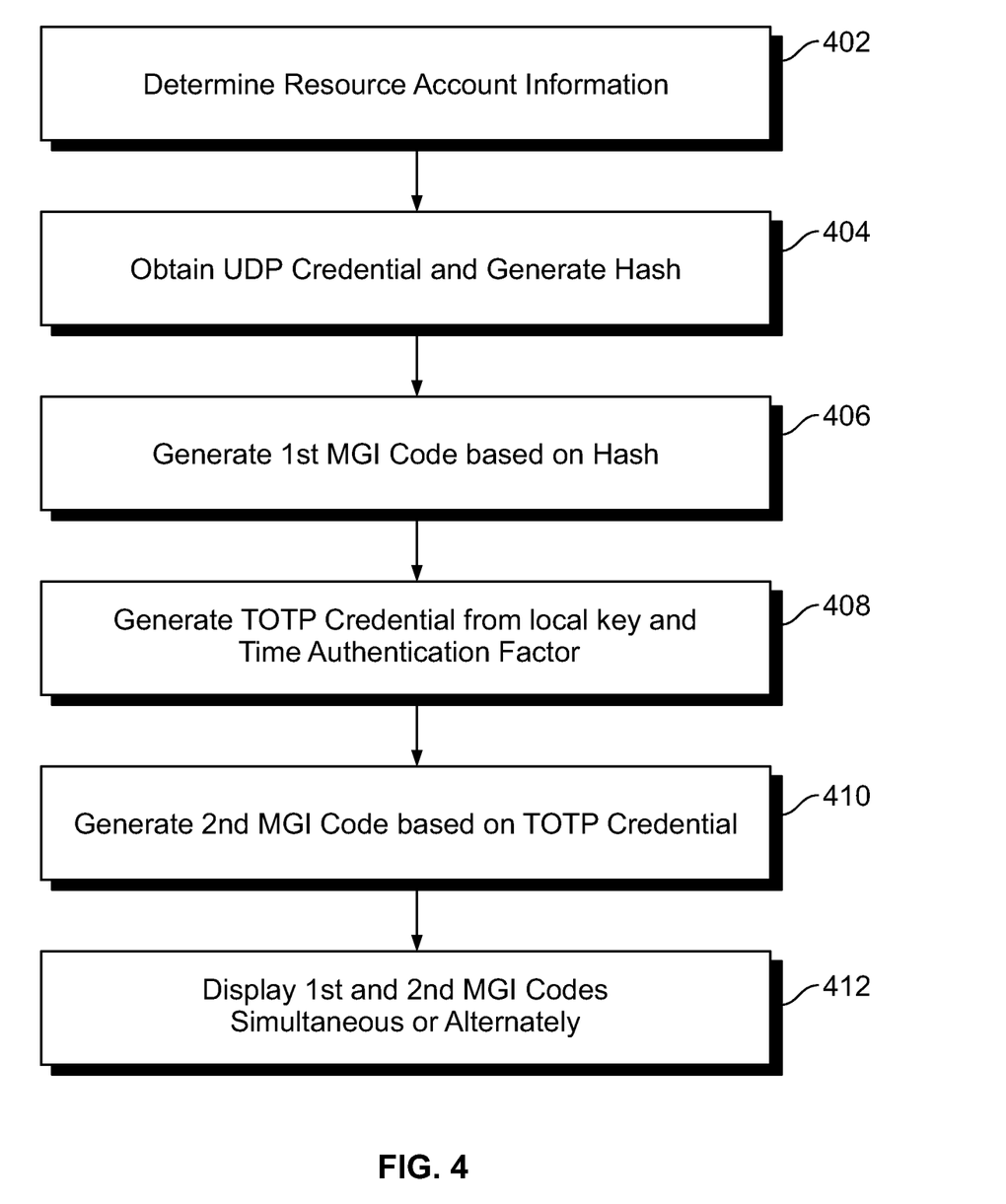
FIG. 4 illustrates a process carried out by a trusted computing device during an authentication operation according to various embodiments described herein.

FIG. 4 illustrates a process carried out by a trusted computing device 105 during an authentication operation according to various embodiments described herein. The operations of FIG. 4 are carried out by one or more processors executing program instructions stored in memory. The operations of FIG. 4 may be distributed between the processors within one or more devices, and may be carried out in various orders.

At 402, one or more processors determine a network resource that the user desires to access and determines resource account information in connection therewith. The resource account information includes unique user defined factors for the user and associated with a user's account. For example, the factors include a user identifier (ID) and UDP factor. Additionally or alternatively, the factors may include one or more challenges/responses that the user has entered to verify that the user is the authorized owner/controller of the account. The user defined factors are stored on the local storage medium of the trusted computing device 105.

At 404, the one or more processors obtain the UDP factor and generate a password hash based on the UDP factor. For example, an encryption algorithm may encrypt the UDP password a predetermined number of iterations (e.g., 5000 times) utilizing various encryption algorithms (e.g., scrypt, bcrypt, argon2, PDBKDF2 crypt, etc.) to form a password hash. The encryption may utilize a unique token that is also know to the authentication service 120 and associated with the user's account.

Optionally, the password hash may be constructed based on a combination of the user ID and the UDP factor, and/or a combination of the UDP factor and a unique ID for the trusted computing device, and/or a combination of all three. Optionally, a first password hash may be construct based on the UDP factor and a second password hash may be constructed based on the user ID. Optionally, a third password hash may be constructed based on a unique ID for the trusted computing device (e.g., a device serial number, MAC ID, etc.).

At 406, the one or more processors generate a first MGI code based on UDP factor. For example, the first MGI code may be a 2D or 3D matrix code corresponding to the password hash generated solely by the UDP factor and/or correspond to a password hash generated based on a combination of the user ID, UDP factor and/or trusted computing device ID. Non-limiting examples of MGI codes include a QR code, bar code and the like.

Additionally or alternatively, a collection of first MGI codes may be generated. For example, separate MGI codes may be generated for each of the user ID, UDP factor and trusted computing device ID.

At 408, the one or more processors generate a TOTP factor based on a pre-shared key and a time authentication factor. For example, the storage medium of the trusted computing device may store a TOTP generation algorithm that, when executed by the one or more processors, generates the TOTP factor based on the pre-shared key and time authentication factor. The pre-shared key is stored on the local storage medium of the trusted computing device 105. The pre-shared key is also shared with and stored with the authentication service 120. The time authentication factor may represent a current time of day or other time related information.

At 410, the one or more processors generate a second MGI code based on the TOTP factor. For example, the second MGI code may be a 2D or 3D matrix code corresponding to the TOTP factor. The TOTP factor is assigned a valid life-span, after which the TOTP factor (and related MGI code) is no longer valid.

At 412, the one or more processors direct the display to display the first and second MGI codes during an authentication operation. For example, the first and second MGI codes may be simultaneously co-displayed or alternately displayed in a successively repeating manner. When alternately displayed, the processor is further configured to rotate the display alternately between presentation of the first and second matrix codes in the alternating and successively repeating manner. The first and second MGI codes may be displayed for predetermined period of time, such as the amount of time for which the TOTP factor is valid (e.g., 1-10 seconds, 10 seconds to 1 minute, etc.).

After the predetermined period of time, the process of FIG. 4 may self-terminate and time out. Alternatively, the process of FIG. 4 may be repeated when the authentication process was not successfully for the first iteration. When repeated, new UDP and TOTP factors are generated along with new MGI codes.

The UDP and TOTP factors generated in connection with FIG. 4 are treated as "candidate" UDP and TOTP factors by the authentication service 120 until the authentication service 120 is able to validate the candidate UDP and TOTP factors based on authentication UDP and TOT factors generated by the authentication service.

Figure 5:
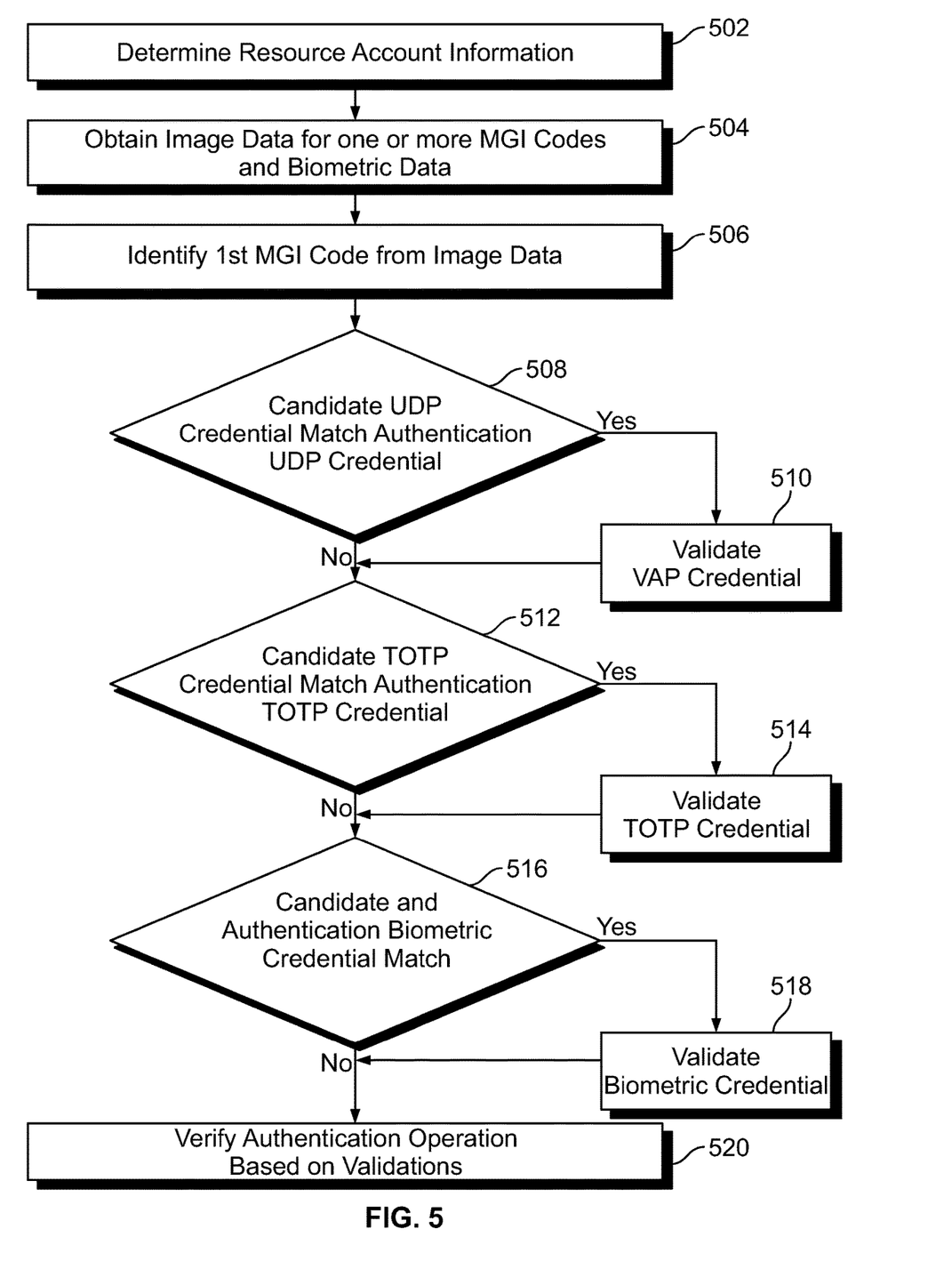
FIG. 5 illustrates a process carried out by an authentication service along or in combination with an AP computing device, during an authentication operation according to various embodiments described herein.

FIG. 5 illustrates a process carried out by an authentication service 120, along or in combination with an AP computing device 106, during an authentication operation according to various embodiments described herein. The operations of FIG. 5 are carried out by one or more processors executing program instructions stored in memory. The operations of FIG. 5 may be distributed between the processors within one or more devices, and may be carried out in various orders.

At 502, one or more processors determine resource account information. For example, the one or more processors identify a network resource that the user desires to access and determines resource account information in connection therewith. In some instances, the AP computing device 106 may be dedicated to a single type of network resource, such as banking or financial information, social media, office network and the like. Accordingly, the one or more processors merely need to identify the user. The user may be identified based on a user ID entered by the user into the AP computing device and/or trusted computing device. Additionally or alternatively, the user may be identified through biometric data, such as facial recognition, fingerprint, iris scan, voice recognition and the like. Additionally or alternatively, the AP computing device may identify the user based on the user's "digital footprint", such as a unique ID wirelessly broadcasts by the trusted computing device (e.g., the MAC ID transmitted during Bluetooth advertising, Wi-Fi advertising and the like).

In instances where the AP computing device 106 may be used to access varied types of network resources, an input is provided to designate the network resource of interest. For example, an application associated with an airline or hotel chain may be opened on the AP computing device 106. Additionally or alternatively, a web browser may be opened on the AP computing device 106 and navigated to a login screen of a network resource (e.g., bank, social media, email login page).

Once the network resource and user are known, the one or more processors access account information for the user. The account information may be stored at the AP computing device, at the authentication service 120 and/or at the network resource. The account information includes, among other things, a UDP factor and any keys to be utilized by the trusted computing device 105 (e.g., a salt key used to encrypt the UDP factor, a key used to generate the TOTP factor).

At 504, the one or more processors obtain, at the AP computing device, image data representative of content in a field of view of a camera of the AP computing device. The content includes one or more MGI codes displayed on the trusted computing device while held in the camera field of view.

Additionally or alternatively, the one or more processors obtain biometric data from the user while the user holds the trusted computing device in the camera's FOV. The biometric data may represent a part of the image data collected by the camera. For example, the image data captured by the camera may include facial/eye image content for the user. Optionally, a separate biometric sensor may be used to collect the biometric data, such as a separate camera to camera separate biometric image data, a fingerprint scanner, a voice recorder and the like. Additionally or alternatively, the one or more processors capture the candidate biometric factor, utilizing a biometric reader, for a user proximate to the trusted computing device while the trusted computing device displays at least one of the first or second MGI codes.

At 506, the one or more processors obtain one or more MGI codes from the image data. For example, an image recognition algorithm may be applied to identify first and second MGI codes that appear adjacent one another (co-displayed) or that appear in an alternating manner on the display of the trusted computing device. Additionally or alternatively, the image data includes a first image that includes the first MGI code and a second image that includes the second MGI code, the first and second MGI codes representing first and second matrix codes. The one or more processors obtain image data that includes display, on the trusted computing device, the first and second matrix codes in one of i) a simultaneous manner or ii) an alternating and successively repeating manner.

The operations at 508 to 520 validating factors from different factor categories by at least two of three technics related to at least two of three categories of factors.

At 508, the one or more processors validate a candidate UDP factor by identifying, from the image data, a first MGI code displayed on the trusted computing device, the first MGI code representative of the candidate UDP factor. The one or more processors determine when the candidate UDP factor matches an authentication UDP factor associated with the user's account. For example, the one or more processors may generate an authentication password hash based on an account authentication password in the factors, and declare the i) validation valid when the candidate password hash matches the authentication password hash. When a match occurs, flow moves to 510; otherwise flow moves to 512.

At 510, the one or more processors validate the UDP factor.

At 512, the one or more processors validate a candidate time-based one-time password (TOTP) factor by identifying, from the image data, a second MGI code displayed on the trusted computing device, the second MGI code representative of the candidate TOTP factor. The one or more processors determine when the candidate TOTP factor matches an authentication TOTP factor. For example, the one or more processors generate the authentication TOTP factor based on a time authentication factor and a pre-shared key, and declare the ii) validation valid when the candidate TOTP factor matches the authentication TOTP factor. When a match occurs, flow moves to 514; otherwise flow moves to 516.

At 514, the one or more processors validate the TOTP factor.

At 516, the one or more processors validate a candidate biometric factor by identifying a candidate biometric factor from at least one of the image data or biometric data from a biometric sensor. The one or more processors determine when the candidate biometric factor matches the authentication biometric factor. When a match occurs, flow moves to 518; otherwise flow moves to 520.

At 518, the one or more processors validate the biometric factor.

At 520, the one or more processors verify the authentication operation based on at least two of the i), ii), and iii) validate operations. The authentication operation allows access, through the AP computing device, to a network resource. For example, the authentication operation may be verified based on validation of the candidate UDP factor and the candidate TOTP factor. Additionally or alternatively, the authentication operation is verified based on validation of the candidate UDP factor, the candidate TOTP factor and the candidate biometric factor. Additionally or alternatively, the authentication operation performs the iii) validation operation by at least one of facial recognition, retinal scan, fingerprint detection, or voice recognition based on data collected by the camera or a sensor.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
 obtaining, at an access point (AP) computing device, image data representative of content in a field of view of a camera of the AP computing device, the content including a machine generated indicia (MGI) code representative of a candidate user defined password (UDP) factor and an additional MGI code representative of a candidate time-based one-time password (TOTP) factorco-displayed separately on a display of a trusted computing device, wherein the content also including and a candidate biometric factor;

validating factors from different factor categories by:
  i) validating the candidate UDP factor by;
    1) identifying, from the image data, the MGI code displayed on the trusted computing device; and
    2) determining when the candidate UDP factor corresponds to an authentication UDP factor associated with a user account, the authentication UDP factor stored at an authentication service;
  ii) validating the candidate TOTP factor by:
    1) identifying, from the image data, an additional MGI code displayed on the trusted computing device; and
    2) determining when the candidate TOTP factor corresponds to an authentication TOTP factor; and
  iii) validating a candidate biometric factor by;
    1) identifying the candidate biometric factor from at least one of the image data; and
    2) determining when the candidate biometric factor corresponds to the authentication biometric factor; and verifying an authentication operation based on the validate operations;

wherein the MGI code and additional MGI code are different MGI codes from one another;

wherein the authentication operation is verified based on validation of the candidate UDP factor and the candidate TOTP factor, the authentication operation allowing access, through the AP computing device, to a network resource;

wherein the image data includes a first image that includes the MGI code and a second image that includes the additional MGI code, the MGI code and the additional MGI code representing first and second matrix codes, the method further comprising displaying, on the trusted computing device, the first and second matrix codes in one of i) a simultaneous manner or ii) an alternating and successively repeating manner; and capturing the candidate biometric factor, utilizing a biometric reader, for a user proximate to the trusted computing device while the trusted computing device displays at least one of the MGI code and additional MGI code.

2. The method of claim 1, wherein the authentication operation is verified based on validation of the candidate UDP factor, the candidate TOTP factor and the candidate biometric factor.

3. The method of claim 1, further comprising performing the iii) validation operation by at least one of facial recognition, retinal scan, fingerprint detection, or voice recognition based on data collected by the camera or a sensor.

4. The method of claim 1, further comprising generating the authentication TOTP factor based on a time authentication factor and a pre-shared key, and declaring the ii) validation when the candidate TOTP factor matches the authentication TOTP factor.

5. The method of claim 1, wherein the validate operations occurs in a simultaneous manner.

6. A computer program product comprising a non-signal computer readable storage medium comprising computer executable code to:

obtain image data representative of content in a field of view of a camera, the content including a machine generated indicia (MGI) code representative of a candidate UDP factor and an additional MGI code representative of a candidate time-based one-time password (TOTP) factor co-displayed separately on a display of on a trusted computing device, wherein the content also including and a candidate biometric factor;

validate factors from different factor categories by:
  i) validating the candidate UDP factor by;
    1) identifying, from the image data, the MGI code displayed on the trusted computing device; and
    2) determining when the candidate UDP factor corresponds to an authentication UDP factor associated with a user account, the authentication UDP factor stored at an authentication service;
  ii) validating the candidate TOTP candidate factor by:
    1) identifying, from the image data, an additional MGI code displayed on the trusted computing device; and
    2) determining when the candidate TOTP factor corresponds to an authentication TOTP factor; and
  iii) validating a candidate biometric factor by;
    1) identifying the candidate biometric factor from at least one of the image data; and
    2) determining when the candidate biometric factor corresponds to the authentication biometric factor; and verifying an authentication operation based on the validate operations;

wherein the MGI code and additional MGI code are different MGI codes from one another;

wherein the authentication operation is verified based on validation of the candidate UDP factor and the candidate TOTP factor, the authentication operation allowing access, through the AP computing device, to a network resource;

wherein the image data includes a first image that includes the MGI code and a second image that includes the additional MGI code, the MGI code and the additional MGI code representing first and second matrix codes, the method further comprising displaying, on the trusted computing device, the first and second matrix codes in one of i) a simultaneous manner or ii) an alternating and successively repeating manner; and capturing the candidate biometric factor, utilizing a biometric reader, for a user proximate to the trusted computing device while the trusted computing device displays at least one of the MGI code and additional MGI code.

7. A computer device, comprising:
a processor;
a storage medium to store program instructions accessible by the processor;
wherein, responsive to execution of the program instructions, the processor to:
obtain, at an access point (AP) computing device, image data representative of content in a field of view of a camera of the AP computing device, the content including a machine generated indicia (MGI) code representative of a candidate user defined password (UDP) factor and an additional MGI code representative of a candidate time-based one-time password (TOTP) factor co-displayed separately on a display of a trusted computing device, wherein the content also including and a candidate biometric factor;

validate factors from different factor categories by:
  i) validating the candidate UDP factor by;
    1) identifying, from the image data, the MGI code displayed on the trusted computing device; and
    2) determining when the candidate UDP factor corresponds to an authentication UDP factor associated with a user account, the authentication UDP factor stored at an authentication service;
  ii) validating the candidate TOTP factor by:
    1) identifying, from the image data, an additional MGI code displayed on the trusted computing device; and
    2) determining when the candidate TOTP factor corresponds to an authentication TOTP factor; and
  iii) validating a candidate biometric factor by;
    1) identifying the candidate biometric factor from at least one of the image data; and
    2) determining when the candidate biometric factor corresponds to the authentication biometric factor; and
  verifying an authentication operation based on the validate operations;
wherein the MGI code and additional MGI code are different MGI codes from one another,
wherein the authentication operation is verified based on validation of the candidate UDP factor and the candidate TOTP factor, the authentication operation allowing access, through the AP computing device, to a network resource;
wherein the image data includes a first image that includes the MGI code and a second image that includes the additional MGI code, the MGI code and the additional MGI code representing first and second matrix codes, the method further comprising displaying, on the trusted computing device, the first and second matrix codes in one of i) a simultaneous manner or ii) an alternating and successively repeating manner; and
capture the candidate biometric factor, utilizing a biometric reader, for a user proximate to the trusted computing device while the trusted computing device displays at least one of the MGI code and additional MGI code.

8. The computer device of claim 7, further comprising an input to receive the UDP factor, the processor to generate a password hash based on the UDP factor.

9. The computer device of claim 8, wherein the storage medium is further configured to store an encryption algorithm executable by the processor to generate the password hash by iteratively encrypting the UDP factor.

* * * * *